United States Patent
Ueda

[11] Patent Number: 5,596,760
[45] Date of Patent: Jan. 21, 1997

[54] PROGRAM CONTROL METHOD AND PROGRAM CONTROL APPARATUS

[75] Inventor: Katsuhiko Ueda, Sakai, Japan

[73] Assignee: Matsushita Electric Industrial Co., Ltd., Osaka, Japan

[21] Appl. No.: 989,056

[22] Filed: Dec. 9, 1992

[30] Foreign Application Priority Data

Dec. 9, 1991 [JP] Japan ................. 3-324417

[51] Int. Cl.$^6$ ........................................ G06F 9/30
[52] U.S. Cl. ........................................ 395/588
[58] Field of Search .................. 395/700, 775, 395/725, 375; 364/200

[56] References Cited

U.S. PATENT DOCUMENTS

| | | | |
|---|---|---|---|
| 4,161,026 | 6/1979 | Wilhite | 395/775 |
| 4,390,966 | 6/1983 | Kawashima et al. | 395/775 |
| 4,566,062 | 1/1986 | Ohnishi et al. | 395/775 |
| 4,794,518 | 12/1988 | Mizushima | 395/775 |
| 4,947,315 | 8/1990 | Sokolow et al. | 395/700 |
| 4,958,275 | 9/1990 | Yokouchi | 364/200 |
| 5,161,229 | 11/1992 | Yasui et al. | 395/775 |
| 5,222,241 | 6/1993 | Murakami et al. | 395/775 |
| 5,247,628 | 9/1993 | Grohoski | 395/725 |
| 5,280,593 | 1/1994 | Bullious, III et al. | 395/775 |
| 5,299,318 | 3/1994 | Bernard et al. | 395/775 |
| 5,317,743 | 5/1994 | Imai et al. | 395/700 |
| 5,388,236 | 2/1995 | Murakami et al. | 395/375 |

FOREIGN PATENT DOCUMENTS 59-47651  3/1984  Japan.

*Primary Examiner*—Jack B. Harvey
*Assistant Examiner*—David A. Wiley
*Attorney, Agent, or Firm*—Ratner & Prestia

[57] ABSTRACT

A program control apparatus includes a memory for storing a REPEAT command to a first address, a calculation command such as sigma command to a second address after the first address, and another calculation command, such as a SUBTRACTION command to a third address after the second address. A repeat controller is operated in response to the REPEAT command for setting a repetition number. A first operation executor operates in response to the sigma command for executing the adding operation repeatedly by the repetition number. A second operation executor operates in response to the SUBTRACTION command for executing the subtraction in parallel to the adding execution in the first executor.

8 Claims, 7 Drawing Sheets

| STATE \ OUTPUT SIGNAL | PRESET (LINE 16) | COUNT ENABLE (LINE 15) | UPDATE PROHIBIT (LINE 18) |
|---|---|---|---|
| STOP 41 | "0" | "0" | "0" |
| REPEAT COUNTER PRESET 42 | "1" | "0" | "0" |
| REPEAT COUNTER COUNT DOWN A 43 | "0" | "1" | "0" |
| REPEAT COUNTER COUNT DOWN B 44 | "0" | "1" | "1" |
| FINAL PROCESSING 45 | "0" | "0" | "1" |

Fig. 6
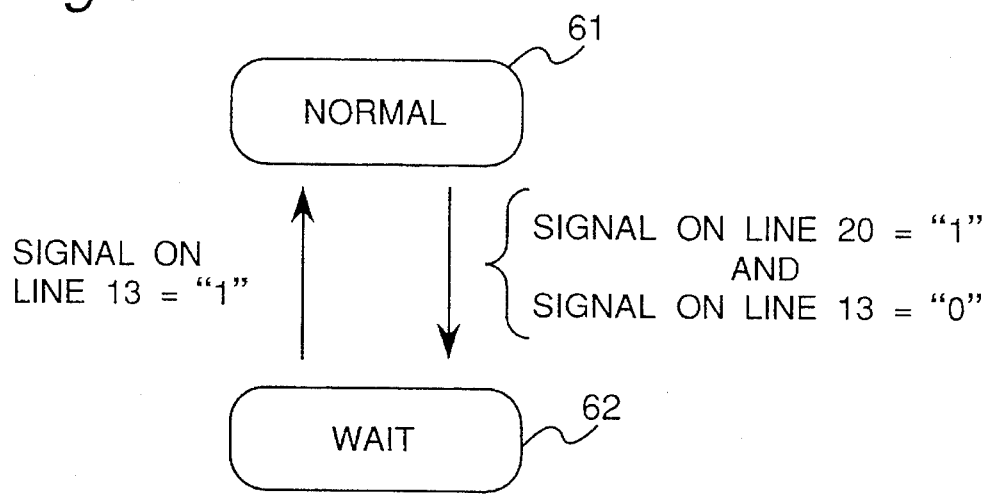
Fig. 7
| STATE / OUTPUT SIGNAL | UPDATE PROHIBIT |
|---|---|
| NORMAL | "0" |
| WAIT | "1" |
Fig. 9
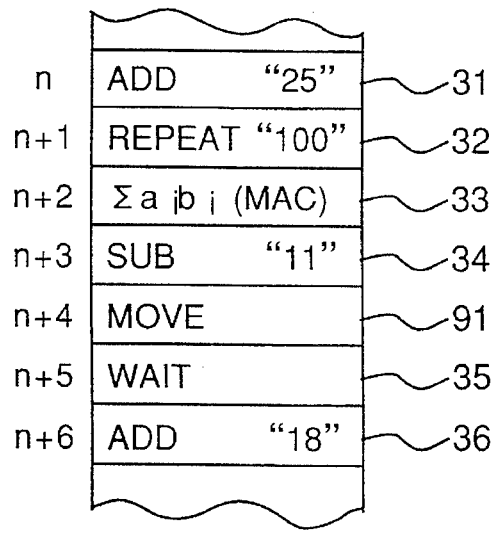

5,596,760

PROGRAM CONTROL METHOD AND PROGRAM CONTROL APPARATUS

BACKGROUND OF THE INVENTION

1. Field of the Invention

The present invention relates to a program control method and program control apparatus for controlling parallel execution of commands (instructions) in a microprocessor.

2. Description of the Prior Art

Program control devices which repeatedly execute already fetched commands as a means of achieving high speed program execution or reducing the number of words in the command memory are known in the prior art.

These devices typically provide in hardware a repeat counter for counting the number of times a single command is repeated, and a repeat counter set command in the command set. The command to be repeatedly executed is placed in the command memory immediately after the repeat counter set command. The number of repetitions for the repeated command is set in the repeat counter by executing the repeat counter set command. The repeat counter is counted down each time the repeated command is executed, and the command following the repeat counter set command (i.e., the command to be repeated) is then repeatedly executed until the value of the repeat counter becomes zero.

In a digital signal processor (DSP) designed for high speed computation, there are often cases in which a limited data set can be processed parallel to the repeated execution of a specific operating command (e.g., a multiply-and-accumulation command). However, parallel processing is not possible with conventional program control devices, and such program control devices are therefore not suited as a command controller for high speed DSP devices.

SUMMARY OF THE INVENTION

Therefore, an object of the present invention is to provide a program control apparatus enabling repeated execution of one command parallel to execution of another command.

To achieve this object, a program control apparatus according to the present invention comprises: memory means for storing at least a first command stored to a first address and specifying repeat execution, a second command stored to a second address after the first address and specifying a first operation to be carried out repeatedly, and a third command stored to a third address after the second address and specifying a second operation to be carried out in parallel to said first operation; command reading means for reading and decoding the commands from said memory means; repeat control means operated in response to said first command for setting a number of repetition; first execution means operated in response to said second command for executing said first operation repeatedly by a number controlled by said repeat control means; and second execution means operated in response to said third command for executing said second operation in parallel to the execution in said first execution means.

BRIEF DESCRIPTION OF THE DRAWINGS

The present invention will become more fully understood from the detailed description given below and the accompanying diagrams wherein:

FIG. 6 is a diagram showing an internal state transition of the sequence controller 21 shown in FIG. 1, FIG. 7 is a table of the outputs from the sequence controller 21 according to the first embodiment of the invention, FIG. 9 is a diagram showing commands stored in the memory in the second embodiment of the invention.

DESCRIPTION OF PREFERRED EMBODIMENTS

Figure 1:
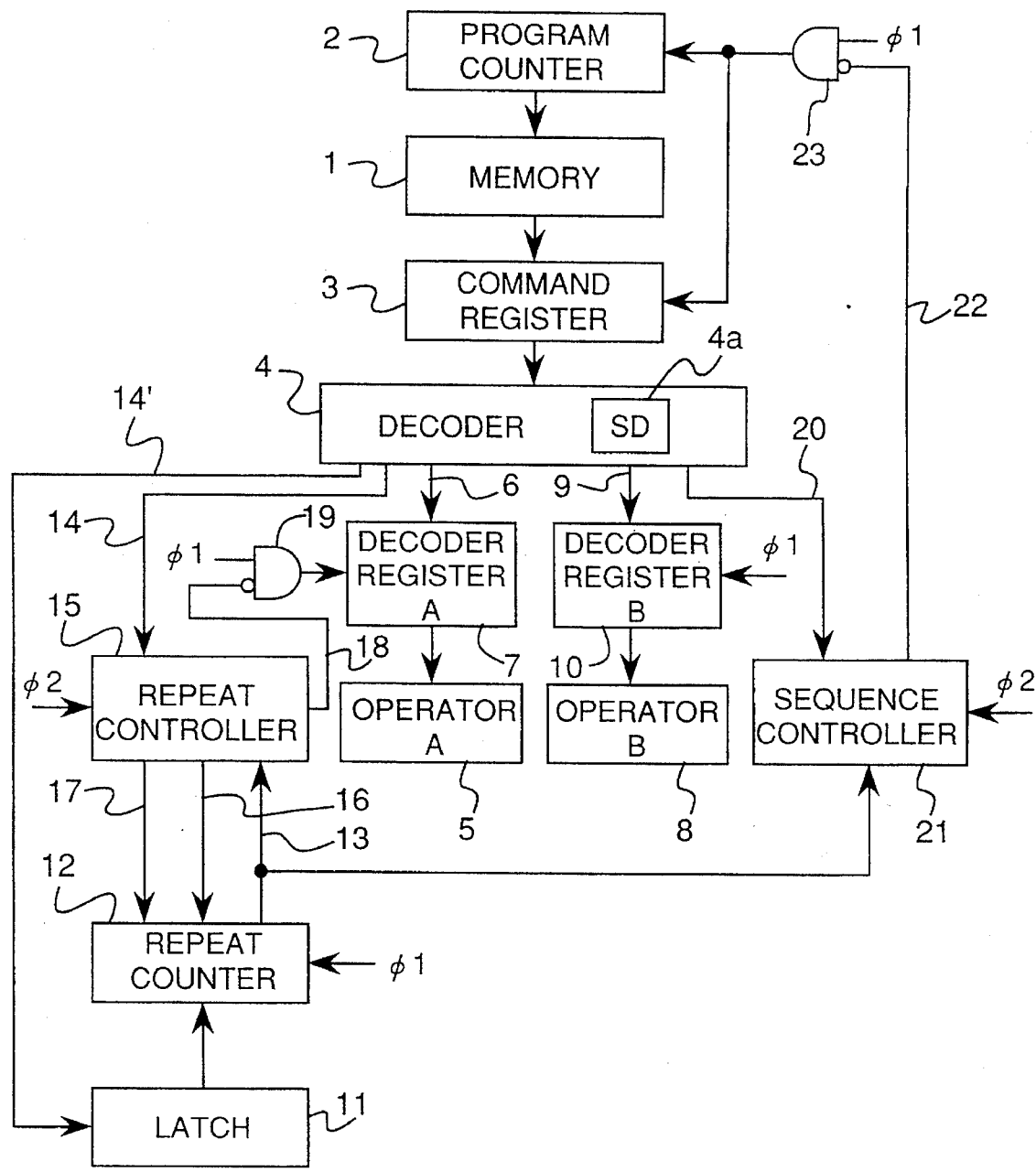
FIG. 1 is a block diagram of a program control apparatus according to the first embodiment of the invention.

Referring to FIG. 1, a block diagram of a program control apparatus according to the first embodiment of the invention is shown.

Figure 3A:
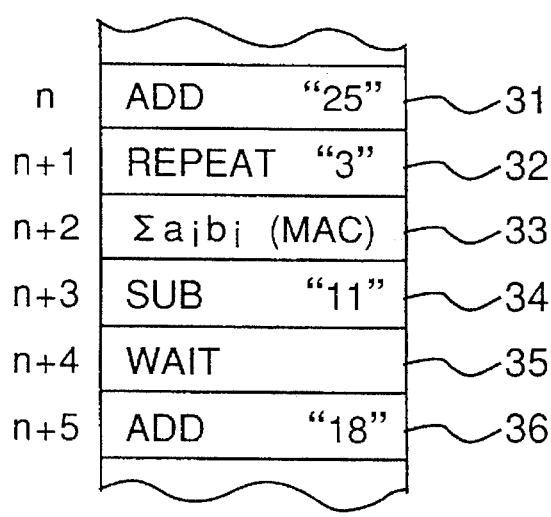
FIG. 3a is a diagram showing commands stored in the memory in the first embodiment of the invention.

Memory 1 stores commands, such as shown in FIG. 3a, which contain: e.g., calculation commands 31, 33, 34, 36 for effecting various calculations; REPEAT command 32 for resetting a repeat counter 12 to a desired number; and WAIT command 35.

Figure 2:
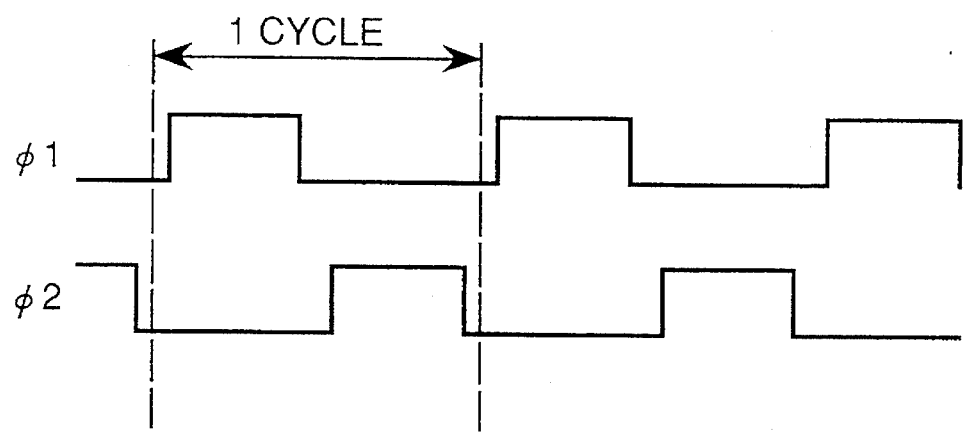
FIG. 2 is a timing chart of the clock used in the first embodiment of the invention.

A program counter 2 is a counter which produces an address signal to the memory 1, and is incremented at the rising point of clock $\phi1$, at which time the command register 3 also reads the output from the memory 1. As shown in FIG. 2, the program control apparatus uses two clocks $\phi1$ and $\phi2$ having the same frequency, but different phase.

Figure 3B:
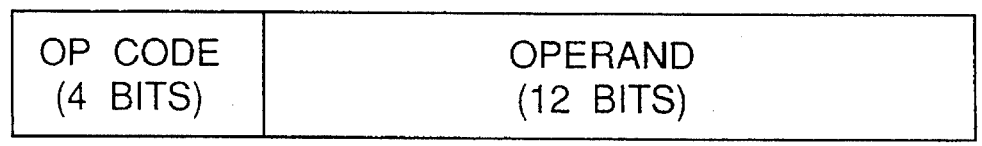
FIG. 3b is a diagram showing a structure of one command.

A decoder 4 decodes output signals from the command register 3, and produces decoded signals each defined by an operation code (4 bits) and an operand (12 bit), as shown in FIG. 3b. The bit lengths of the code and the operand can be any other than those given in the above parentheses. Decoder 4 has a signal distributer 4a which distributes the decoded signal to one of lines 6, 9, 14, 14' and 20 in accordance with the operation code, as shown in Table 1 below.

TABLE 1

| OP CODE | OUTPUT | COMMAND | OPERATION |
| --- | --- | --- | --- |
| 0000 | Line 9 | ADD | Add operand amount in operator B |
| 0001 | Line 9 | SUBTRACT | Subtract operand amount in operator A |
| 0010 | Line 9 | LOGIC AND | Take AND with operand amount in operator B |
| 0011 | Line 9 | LOGIC OR | Take OR with operand amount in |

TABLE 1-continued

| OP CODE | OUTPUT | COMMAND | OPERATION |
|---------|--------|---------|-----------|
| 0100 | Line 6 | $\Sigma a_i b_i$ (MAC) | Add ($a_i \times b_i$) for m times in operator A |
| 0101* | Line 102 | MOVE | Move the result in operator B to multiplexer 104 |
| 1000 | Line 14 (operand line 14') | REPEAT | Give repeat command to controller 15 and repeat number in operand to latch 11 |
| 1001 | Line 20 | WAIT | Give wait command to controller 21 |

Note*:
Command MOVE with Operation code 0101 is used in the second embodiment.

When the operation code is any one of "0000", "0001", "0010" and "0011", the decoded code signal, as well as the decoded operand signal, is outputted through line 9 to decoder register B and further to operator B. When the operation code is "0100", the decoded code signal, as well as the decoded operand signal, is outputted through line 6 to decoder register A and further to operator A. When the operation code is "1000", the decoded code signal is outputted through line 14 to repeat controller 15 and the decoded operand signal is outputted through line 14' to latch 11. When the operation code is "1001", the decoded code signal is outputted through line 20 to sequence controller 21.

Also, as shown in Table 1, when the decoded operation code is "0000" representing the ADD command, operator B is activated to add the amount given by the operand following the operation code "0000". When the decoded operation code is "0001" representing the SUBTRACT command, operator B is activated to subtract the amount given by the operand following the operation code "0001". When the decoded operation code is "0010" representing the logic AND command, operator B is activated to take logic AND with the amount given by the operand following the operation code "0010". When the decoded operation code is "0011" representing the logic OR command, operator B is activated to take logic OR with the amount given by the operand following the operation code "0011". When the decoded operation code is "0100" representing the MAC command (MAC is a mnemonic for multiply-and-accumulation), operator A is activated to multiply and add ($a_i \times b_i$) for m times (m is a positive integer). When the decoded operation code is "1000" representing the REPEAT command, the repeat controller 15 is activated and the repeat counter 12 is reset to a number temporarily stored in latch 11, which has latched a number carried in the operand following the operation code "1000". When the decoded operation code is "1001" representing the WAIT command, sequence controller 21 is activated to produce a prohibit signal 22 until repeat counter 12 counts down to zero. In the description herein, the reference numbers for the lines are also used for designating the signals transmitted in the corresponding lines.

It is to be noted that after the REPEAT command, always follows is a command for operating a calculation in operator A.

In operation, as the program counter 2 counts up, the address designated in memory is incremented. Thus, the commands designated by the program counter 2 is read from the memory 1 and is stored in command register 3.

According to the example shown in FIG. 3a, when ADD command 31 in address n is read, decoder 4 sends the command Add "25" along line 9 to decoder register B and further to operator B to carry out the calculation of "+25" to what has been already calculated.

When REPEAT command 32 in address n+1 is read, decoder 4 sends along line 14 the command Repeat indicated by logic "1" to repeat controller 15 and also sends along line 14' the number of repetition which is in this case "3" to latch 11. Then, the repeat counter 12, which is a down counter, is reset to the number, that is 3 in this case, stored in latch 11.

Next, when the MAC command 33 in address n+2 is read, decoder 4 sends along line 6 the command $\Sigma a_i b_i$ to decoder register A and further to operator A. The operator A carries out the calculation of $$a_1 \times b_1 + a_2 \times b_2 + a_3 \times b_3 + a_4 \times b_4$$

using the present cycle and the subsequent three cycles as counted by repeat counter 12.

While the operator A is carrying out the multiply and accumulation (MAC) calculation, SUBTRACT command 34 in address n+3 is read, so that decoder 4 sends along line 9 the command Subtract "11" to decoder register B and further to operator B to carry out the calculation of "−11" to what has been already calculated. Thus, the calculation "−11" in operator B and the calculation "+$a_2 \times b_2$" in operator A are carried out in parallel.

Then, when WAIT command 35 in address n+4 is read, decoder 4 sends along line 20 to the sequence controller 21 the WAIT command indicated by logic "1". Thus, the sequence controller 21 produces a prohibit signal "1" to AND gate 23 to stop counting the program counter 2. Thus, in the next cycle, the same WAIT command is sent from decoder 4 to sequence controller 21 which again produces the prohibit signal. Then, when the repeat counter 12 has counted down to zero, the sequence controller 21 stops producing the prohibit signal.

Then, the program counter 2 is incremented to read the ADD command 36 in address n+5. Thus, decoder 4 sends the command Add "18" along line 9 to decoder register B and further to operator B to carry out the calculation of "+18" to what has been already calculated.

According to the present invention, the program control apparatus operates in the pipeline processing in three sequential stages, the first stage for increasing the program counter 2 and reading the memory 1, the second stage for storing the command in the command register 3 and decoding the command in decoder 4, and the third stage for storing the decoded command in register A or B and carrying out the command in operator A or B. A further detail of the operation under the pipeline processing is described below.

First, various operation timings with respect to clocks $\phi 1$ and $\phi 2$ are described.

The control signals 6 and 9 are stored in the decoder registers A and B at the rise of clock $\phi 1$. The latch 11 holds the decoded repetition number, which is used for resetting the repeat counter 12. The repeat counter 12, which is a down counter, counts down at each rise of clock $\phi 1$. When the repeat counter 12 value becomes zero (0), the zero detection signal 13 takes a value of "1."

The zero detection signal 13 and the REPEAT command detect signal 14 are input to the repeat controller 15. When the clock $\phi 2$ rises, the internal state of the repeat controller 15 changes, and the repeat controller 15 outputs the preset signal 16 and count enable signal 17 to the repeat counter 12, and outputs the decoder register update prohibit signal 18 to the AND gate 19.

The preset signal 16 directs the repeat counter 12 to read the data stored in latch 11 at the rise of clock φ1, and the count enable signal 17 also directs the repeat counter 12 to count down at the rise of clock φ1. The decoder register update prohibit signal 18 prohibits the contents of the decoder register A from being updated, and the AND gate 19 outputs the result of an AND operation on the decoder register update prohibit signal 18 and clock φ1 to the decoder register A.

The WAIT command detect signal 20 and the zero detection signal 13 are input to the sequence controller 21. The internal state of the sequence controller 21 is changed at the rise of clock φ2, and the sequence controller 21 outputs the update prohibit signal 22, which prevents updating the contents of the program counter 2 and the command register 3. Finally, the AND gate 23 outputs the result of an AND operation on the update prohibit signal 22 and clock φ1 to the command register 3.

Figures 4, 5:
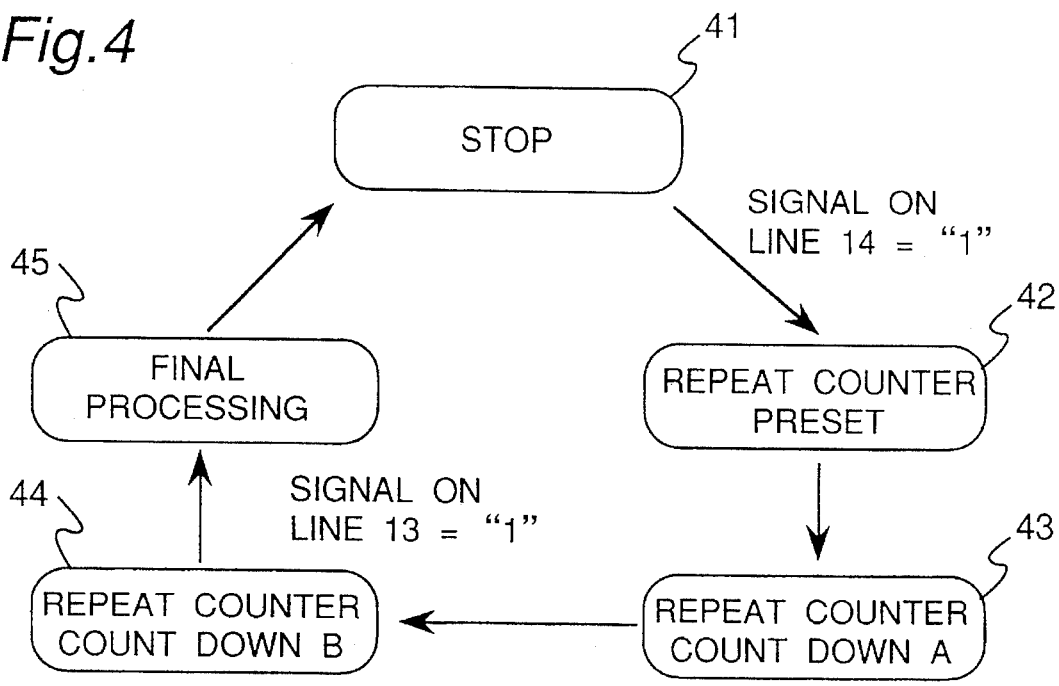
FIG. 4 is a diagram showing an internal state transition of the repeat controller 15 shown in FIG. 1.
FIG. 5 is a table of the outputs from the repeat controller 15 according to the first embodiment of the invention.

The internal state changes of the repeat controller 15 are shown in FIG. 4. The repeat controller 15 has five states: a stop state 41, a repeat counter preset state 42, repeat counter count-down state A 43, repeat counter count-down state B 44, and final processing state 45.

The change from the stop state 41 to the repeat counter preset state 42 occurs at the rise of clock φ2 when the REPEAT command detect signal 14, which indicates detection of the REPEAT command 32 by the decoder 4, has a value of "1". The change from the repeat counter preset state 42 to the repeat counter count-down state A 43 occurs unconditionally according to the clock φ2. The change from the repeat counter count-down state A 43 to the repeat counter count-down state B 44 also occurs unconditionally according to the φ2 clock. The change from the repeat counter count-down state B 44 to the final processing state 45 occurs according to the clock φ2 when the zero detection signal 13, which indicates the value of the repeat counter 12 is zero, has a value of "1." The change from the final processing state 45 to the stop state 41 occurs unconditionally according to the clock φ2. The repeat controller 15 outputs the preset signal 16, count enable signal 17, and decoder register update prohibit signal 18 with the values shown in FIG. 5 dependent upon the current repeat controller 15 state.

The internal state changes of the sequence controller 21 are shown in FIG. 6. The sequence controller 21 has two internal states: a normal state 61, and a wait state 62. The change from the normal state 61 to the wait state 62 occurs in response to the clock φ2 after when the WAIT command detect signal 20, which indicates the decoder 4 has detected the WAIT command 35, has a value of "1," and the zero detection signal 13 value is "0." The state change back to the normal state 61 occurs in response to the clock φ2 after when the zero detection signal 13 value is "1." The sequence controller 21 outputs the update prohibit signal 22 with a value of 0 or 1 depending upon the current internal state as shown in FIG. 7.

Figure 8:
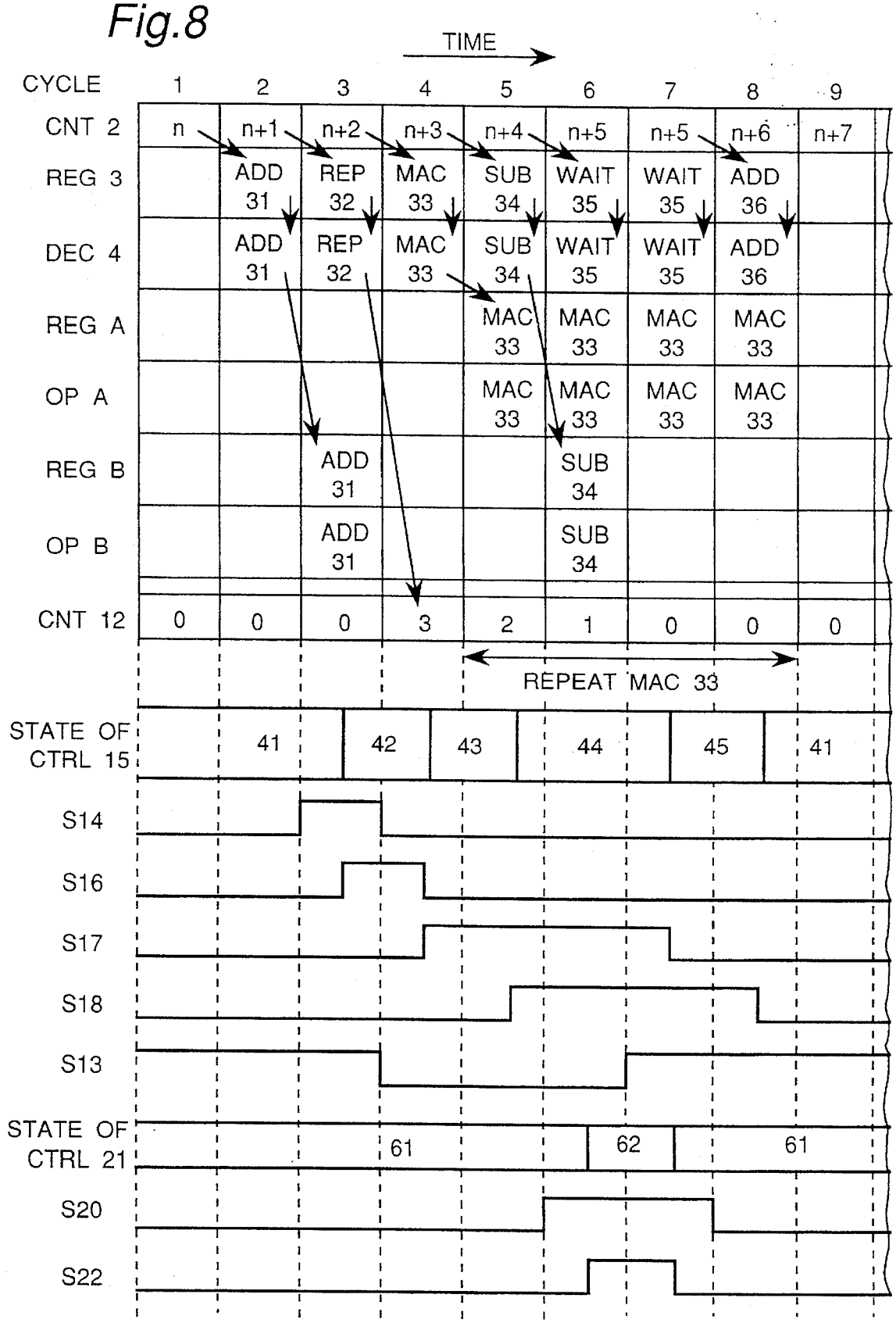
FIG. 8 is a table of the command execution process used to describe the operation of the first embodiment of the invention.

The states of the various components and signals comprising the program control apparatus shown in FIG. 1 are shown in FIG. 8. It is to be noted that the cycle numbers shown in FIG. 8 correspond to the cycle numbers used in the following description, and that each cycle is equal to one cycle length of the clocks φ1 and φ2, which are almost in opposite phase, as shown in FIG. 2.

The operation of the program repeat control apparatus comprised as described above is described below based on the cycle numbers shown in FIG. 8 and with reference to FIGS. 1, 3, 4, 5, 6, 7, and 8.

(1) Cycle 1
a. Program counter 2 is incremented according to the clock φ1 to change the counted value to n.
b. Memory 1 accesses address n.

(2) Cycle 2
a. Program counter 2 is incremented according to the clock φ1 to change the counted value to n+1.
b. Memory 1 accesses address n+1.
c. Command register 3 at the rise of clock φ1 fetches ADD command 31 which was the content of the address n accessed in the previous cycle.
d. Decoder 4 decodes the fetched ADD command 31.

(3) Cycle 3
a. Program counter 2 is incremented according to the clock φ1 to change the counted value to n+2.
b. Memory 1 accesses address n+2.
c. Command register 3 at the rise of clock φ1 fetches the REPEAT command 32, which was the content of the address n+1 accessed in the previous cycle.
d. Decoder 4 sets the value of the REPEAT command detect signal 14 to 1 based on the result of REPEAT command 32 decoding.
e. Repeat controller 15 changes its internal state from the stop state 41 to the repeat counter preset state 42 at the rise of clock φ2 because the REPEAT command detect signal 14 value is "1." As a result, the repeat controller 15 sets the preset signal 16 value to 1 as shown by the repeat count-down preset state in FIG. 5.
f. Decoder register B latches the signal controlling the operator B in the result of ADD command 31 decoded by the decoder 4, and the operator B operates accordingly.

(4) Cycle 4
a. Program counter 2 is incremented according to the clock φ1 to change the counted value to n+3.
b. Memory 1 accesses address n+3.
c. Command register 3 at the rise of clock φ1 fetches the repeat execution command, such as MAC command 33, which was the content of the address n+2 accessed in the previous cycle.
d. Decoder 4 decodes the MAC command 33.
e. Repeat counter 12 reads the value stored by the latch 11 ("3" in this case) at the rise of clock φ1 because the preset signal 16 value is 1.
f. Repeat controller 15 changes its internal state from the repeat counter preset state 42 to the repeat counter count-down state A 43 at the rise of clock φ2. As a result, the repeat controller 15 sets the decoder count enable signal 17 value to 1 as shown by the repeat counter count-down state A in FIG. 5.

(5) Cycle 5
a. Program counter 2 is incremented according to the clock φ1 to change the counted value to n+4.
b. Memory 1 accesses address n+4.
c. Command register 3 at the rise of clock φ1 fetches SUBTRACTION command 34, which was the content of the address n+3 accessed in the previous cycle.
d. Decoder 4 decodes the SUBTRACTION command 34.
e. Repeat counter 12 counts down from 3 to 2 at the rise of clock φ1 because the count enable signal 17 value is 1.
f. Repeat controller 15 changes its internal state from the repeat counter count-down state A 43 to the repeat counter count-down state B 44 at the rise of clock φ2. As a result, the repeat controller 15 sets the decoder count enable signal 17 and the decoder register update prohibit signal 18 values to 1 as shown by the repeat counter count-down state B in FIG. 5.

g. Decoder register A 7 latches the signal controlling the operator A 5 based on the result of decoding the MAC command 33 by the decoder 4, and the operator A 5 functions accordingly.

(6) Cycle 6 a. Program counter 2 is incremented according to the clock φ1 to change the counted value to n+5.

b. Memory 1 accesses address n+5.

c. Command register 3 at the rise of clock φ1 fetches the WAIT command 35, which was the content of the address n+4 accessed in the previous cycle.

d. Decoder 4 decodes the WAIT command 35.

e. Repeat counter 12 counts down from 2 to 1 because the count enable signal 17 value is 1.

f. Repeat controller 15 holds the repeat counter count-down state B in FIG. 5.

g. Decoder register A 7 holds the decoded result of the MAC command 33 because the decoder register update prohibit signal 18 value is 1, and the operator A 5 continues to execute the same operation.

h. Sequence controller 21 changes its internal state from the normal state 61 to the wait state 62 according to the clock φ2 because the WAIT command detect signal 20 value is 1. The update prohibit signal 22 value therefore becomes 1 as shown in FIG. 7. As a result, the SUBTRACTION command 34 is executed parallel to MAC command 33 execution during this cycle.

(7) Cycle 7 a. Program counter 2 is not incremented at the rise of clock φ1 and therefore remains n+5 because the update prohibit signal 22 value is 1.

b. Memory 1 does not access address n+5 at the rise of clock φ1 and retains the WAIT command 35 because the update prohibit signal 22 value is 1.

c. Repeat counter 12 counts down from 1 to 0 because the count enable signal 17 value is 1, and sets the zero detection signal 13 to 1 because the counter value is now 0.

d. Repeat controller 15: changes its internal state from the repeat counter count-down state B 44 to the final processing state 45 at the clock φ2 because the zero detection signal 13 value is 1, and only the decoder register update prohibit signal 18 value is set to 1 as shown in FIG. 5.

e. Sequence controller 21 changes its internal state from the wait state 62 to the normal state 61 according to the clock φ2 because the zero detection signal 13 value is 1. The update prohibit signal 22 value therefore becomes 0 as shown in FIG. 7.

(8) Cycle 8 a. Program counter 2 is incremented at the rise of clock φ1 and becomes n+6 because the update prohibit signal 22 value is now 0.

b. Memory 1 accesses address n+6.

c. Command register 3 at the rise of clock φ1 fetches ADD command 36, which was the content of the address n+5, because the update prohibit signal 22 value is 0.

d. Decoder 4 decodes the ADD command 36.

e. Repeat counter 12 does not count down because the count enable signal 17 value is 0.

f. Repeat controller 15 changes its internal state from the final processing state 45 to the stop state 41 at the clock φ2, and all output signals are set to 0 as shown in FIG. 5.

g. Decoder register A 7 holds the decoded result of the MAC command 33 because the decoder register update prohibit signal 18 value is 1, and the operator A 5 continues to execute the same operation.

h. Sequence controller 21 holds the normal state 61.

(9) Cycle 9 a. Execution of the MAC command 33 stops and commands are normally executed because both the decoder register update prohibit signal 18 and the program counter 2 values are 0.

As described above, a program control apparatus according to the present invention can execute a group of commands (consisting of only one command in this embodiment to simplify the description) between the MAC command 33 and the WAIT command 35 parallel with execution of the MAC command 33 being repeatedly executed, and is suited to high speed operation.

It is to be noted that while the parallel execution command group between the MAC command 33 and the WAIT command 35 consists of only one command in the above embodiment, this was only to simplify the description, and the program control apparatus according to the present invention will function correctly when this command group includes plural commands, and when repeated execution of the repeat execution command, such as MAC command 33 terminates before execution of the parallel execution command group terminates.

SECOND EMBODIMENT

The program control apparatus according to the second embodiment of the invention is described below with reference FIG. 10.

The second embodiment differs from the first shown in FIG. 1 in the following points only. All components identified with the same reference numbers are functionally identical.

The decoder 101 in the second embodiment decodes the output from the command register 3 to output, in addition to the outputs of the decoder 4 in the first embodiment, a MOVE command detection signal 102. The MOVE command detection signal 102, which is "1" when the decoder 101 decodes the MOVE command 91 described below, is applied to the repeat counter 103 and the multiplexer 104.

The multiplexer 104 outputs the latch 11 output to the repeat counter 103 when the MOVE command detection signal 102 value is "0," and outputs the operator B 8 output when the MOVE command detection signal 102 value is "1."

The repeat counter 103 is initialized to the multiplexer 104 output value when the preset signal 16 or the MOVE command detection signal 102 value is "1," and counts down at the rise of clock φ1.

The operator B 8 output is applied to the multiplexer 104 through line 105.

The contents of the memory 1 are shown in FIG. 9, which are similar to those shown in FIG. 3a, but further has a MOVE command 91 stored to address n+4. More specifically, ADD command 31 is stored to address n, REPEAT command 32 is stored to address n+1, MAC command 33 is stored to address n+2, SUBTRACTION command 34 is stored to address n+3, MOVE command 91 is stored to address n+4, WAIT command 35 is stored to address n+5, and ADD command 36 is stored to address n+6. The MOVE command 91 is used to preset the operator B 8 output in the repeat counter 103 through the multiplexer 104 as will be described below.

Figure 10:
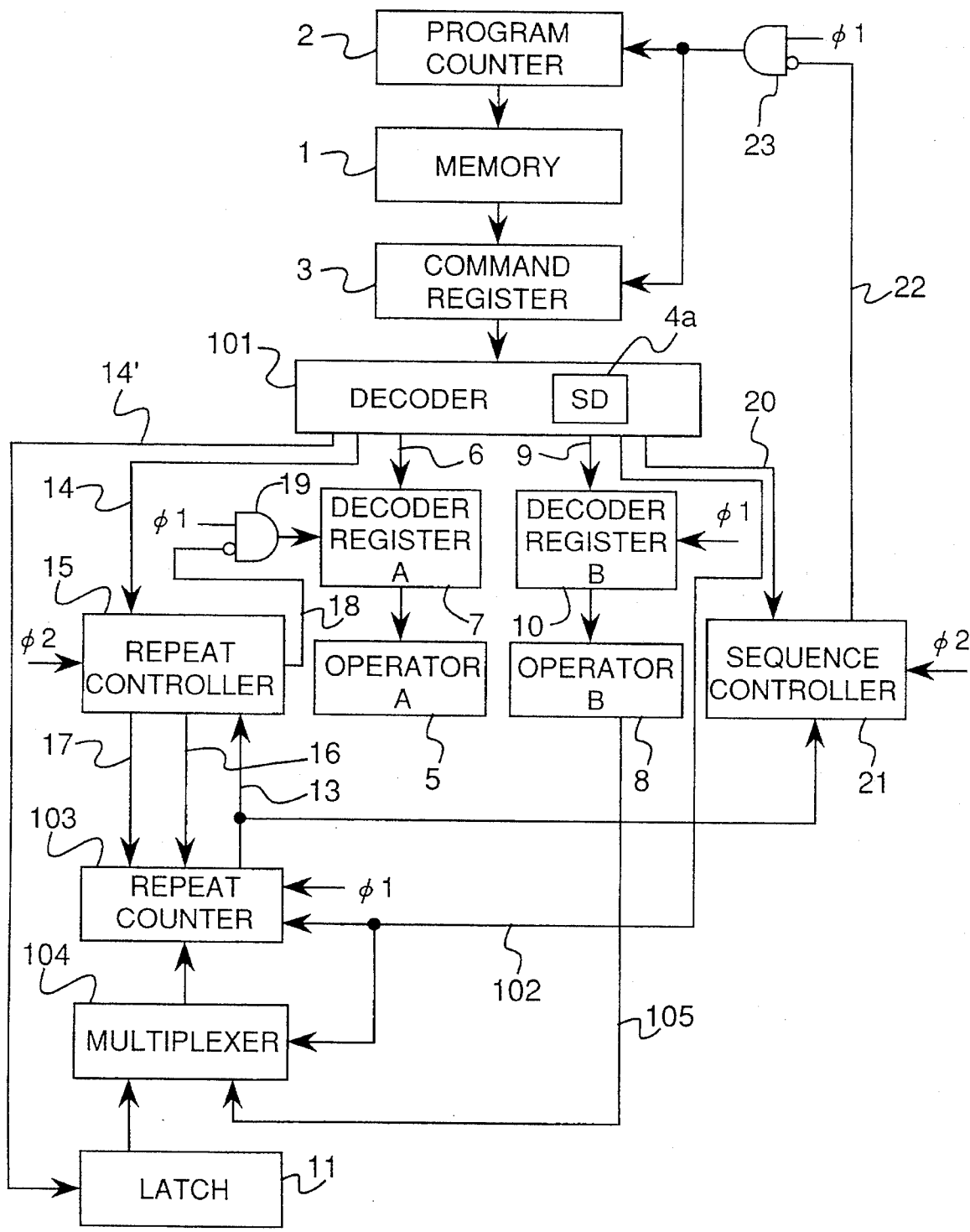
FIG. 10 is a block diagram of a program control apparatus according to the second embodiment of the invention.
Figure 11:
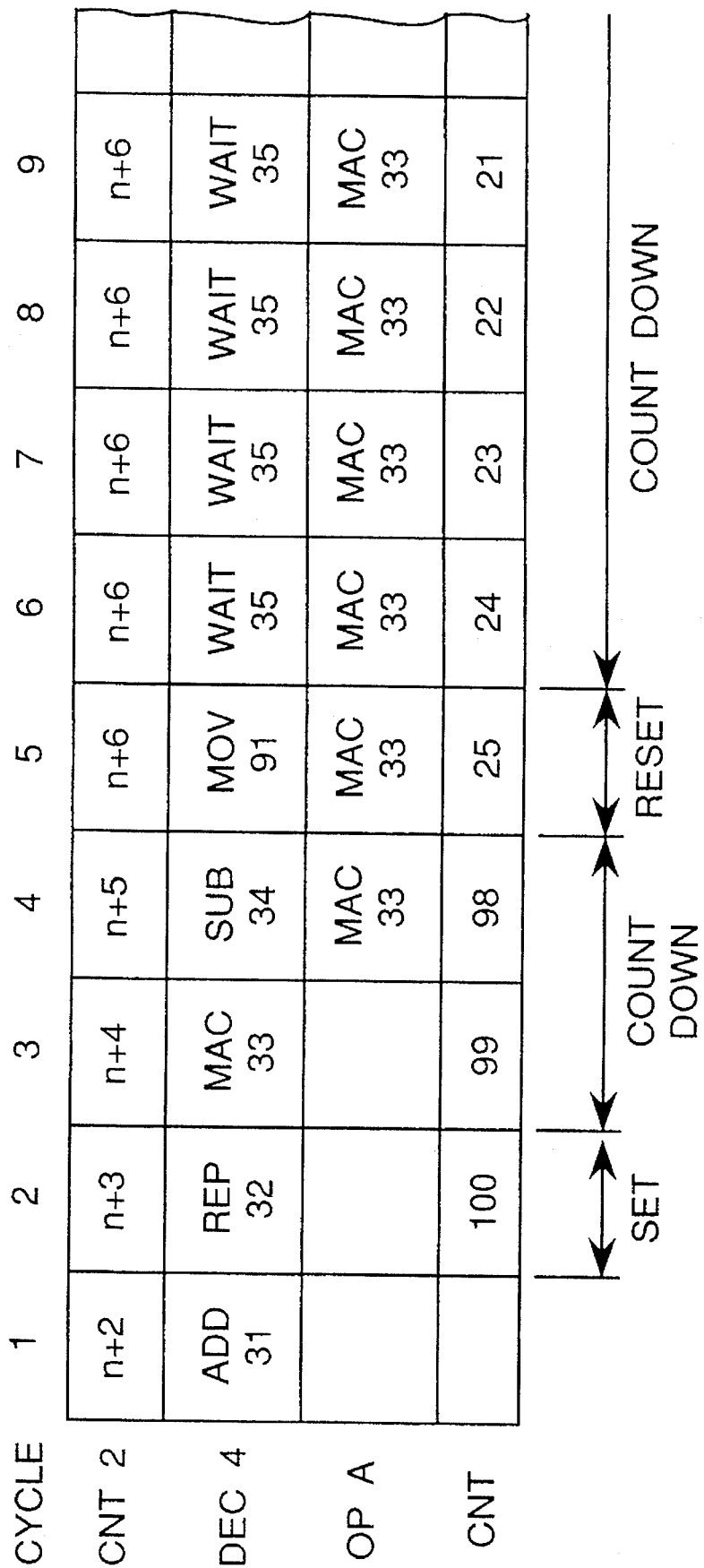
FIG. 11 is a table of the command execution process used to describe the operation of the second embodiment of the invention.

The operation of the program repeat control apparatus thus comprised as shown in FIG. 10 is described below based on the cycle numbers shown in FIG. 11.

Commands 31, 32, 33, and 34 in FIG. 9 and the operations thereof are the same as those described above with reference to the first embodiment. Thus, the REPEAT command 33 is executed parallel to the commands starting at command 34 beginning in cycle 4. It is assumed, however, that the preset value 100 for the number of repetition is stored in the latch 11. Thus, repeat counter 103 is tentatively or presumptively set to 100.

At cycle 4 the operation determined by SUBTRACTION command 34 is executed using operator B 8, and the result of this SUBTRACTION command 34 is used for resetting the repeat counter 103 with a number which is actually required. In other words, when the command group shown in FIG. 9 is used as a subroutine, the number of repeated command 33 executions must often be changed dynamically, and the operation to determine this number of executions is executed as command 34. As a result, execution of MAC command 33 is started with a temporary value of 100, and the actual number of repetitions required is then determined by command 34, which in this case is a SUBTRACTION command. It is assumed that the result of the SUBTRACTION command 34 is "25". It is possible to add further commands other than command 34 to calculate the actually required number of repetition.

The MOVE command 91 is executed parallel to MAC command 33 execution at cycle 5. Specifically, when the MOVE command 91 is decoded by the decoder 101, the MOVE command detection signal 102 value becomes "1" and the multiplexer 104 transmits the output from operator B 8 to the repeat counter 103. Because the MOVE command detection signal 102 value is "1," the repeat counter 103 is again preset according to the multiplexer 104 output. As a result, the repeat counter 103 is set to the value 25 in operator B 8.

The WAIT command is executed at cycle 6. As described in the first embodiment above, however, incrementing the program counter 2 and operation of the command register 3 are prohibited insofar as the zero detection signal 13 value is "0." From cycle 7, as a result, the MAC command 33 alone is executed until the repeat counter 103 reaches zero.

As described above, a program control apparatus according to the second embodiment of the invention is suited to high speed operation and the time required to calculate the number of command repetitions is not noticed because calculating the number of times the MAC command 33 should be executed is performed parallel to execution of that command 33.

Furthermore, the number of repetitions calculation is completed in a single step (command 34) in the above description for simplification, but in practice this may take up to several dozen steps. As a result, the facts, that this calculation is performed parallelly and the time required for calculation processing is not apparent, greatly enhance the practical effectiveness of the invention.

As described hereinabove, the present invention achieves a program control apparatus capable of controlling parallel execution of a repeatedly executed command and a command group following thereafter by providing in memory a REPEAT command for controlling the execution repeat process, and a WAIT command for synchronizing the repeatedly executed command with commands that cannot be parallel processed, and providing a decoder register, repeat counter, repeat controller, and sequence controller.

In addition, by providing a repeatedly executed command, a command group following the repeatedly executed command, and a command for calculating the value set in the repeat counter and a MOVE command for moving the calculated result to the repeat counter in the command group, the time required to calculate the number of repetitions can be prevented from becoming apparent by setting the correct number of repetitions in the repeat counter after starting repeated execution of the repeat execution command, and a program control apparatus enabling high speed operation can be achieved as a result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A program control apparatus comprising:

memory means for storing at least a repeat command stored to a first address and specifying repeat execution, a repeating operation command stored to a second address after the first address and specifying a repeating to be carried out repeatedly, subsequent commands stored to a third address after the second address and specifying subsequent operations to be carried out in parallel to said repeating operation, a move command stored to a fourth address following the third address and specifying a move function, and a wait command stored to a fifth address following the fourth address and specifying a wait function;

program counter means for producing an address signal to said memory means;

command register means for temporarily storing a command read from said memory means at an address specified by said address signal;

decoder means for decoding the command stored in said command register means;

repeat control means operated in response to said repeat command for setting a number of repetition, and for counting the repetition number, said repeat control means producing a count-up signal after said repetition number is counted;

first execution means operated in response to said repeating operation command for executing said repeating operation repeatedly by said repetition number while said repeat control means is counting the repetition number;

second execution means operated in response to said subsequent commands for executing said subsequent operations in parallel to the repeating operation in said first execution means for calculating a new repetition number;

repetition number renewing means operated in response to said move command for renewing said repetition number set in said repeat control means with said new repetition number calculated by said second execution means; and sequence control means operated in response to said wait command for producing a prohibit signal to said program counter means for stop producing said address signal until said repeat control means produces said count-up signal.

2. A program control apparatus as claimed in claim 1, wherein said repetition number is carried in said repeating operation command.

3. A program control apparatus as claimed in claim 1, wherein said repeat control means comprises a down-counter for counting down said repetition number, and producing said count-up signal when said down-counter has counted down to zero.

4. A program control apparatus as claimed in claim 1, wherein said first execution means comprises: a first register for temporarily holding and outputting said repeating operation command in response to each count effected in said repeat control means; and a first operator for executing said repeating operation after each output of said repeating operation command.

5. A program control apparatus as claimed in claim 1, wherein said second execution means comprises; a second register for temporarily holding and outputting said subsequent commands; and a second operator for executing said subsequent operations after each output of said subsequent commands.

6. A program control apparatus as claimed in claim 1, wherein said first, second, third, fourth and wait commands have first, second, third, fourth and fifth type operation codes, respectively.

7. A program control apparatus as claimed in claim 6, further comprising signal distributor means for distributing the decoded command to said repeat control means when the command has the repeating operation code, to said first execution means when the command has the subsequent operations code, to said second execution means when the command has the third operation code, to said repetition number renewing means when the command has the fourth operation code, and to said sequence control means when the command has the fifth operation code.

8. A program control method comprising the steps of:

storing at least a repeat command to a first address and specifying repeat execution, a repeating operation command to a second address after the first address and specifying a repeating operation to be carried out repeatedly, and subsequent commands to a third address after the second address and specifying subsequent operations to be carried out in parallel to said repeating operation, a move command to a fourth address following the third address and specifying a move function, and a wait command to a fifth address following the fourth address and specifying a wait function;

reading and decoding the commands;

executing a repeating operation determined by said repeating operation command repeatedly by a repetition number determined by said repeat command in a first execution means;

executing subsequent operations determined by said subsequent commands in parallel to the execution of the repeating operation in a second execution means for calculating a new repetition number;

renewing said repetition number, in response to said move command, with said new repetition number; and stopping a further execution in said second execution means in response to said wait command until said repeating operation is executed repeatedly by said repetition number.

\* \* \* \* \*

UNITED STATES PATENT AND TRADE MARK OFFICE
CERTIFICATE OF CORRECTION

PATENT NO. : 5,596,760
DATED : January 21, 1997
INVENTOR(S) : Ueda

It is certified that error appears in the above-identified patent and that said Letters Patent is hereby corrected as shown below:

Column 10, line 29, after "repeating" insert --operation--.

Signed and Sealed this

Second Day of September, 1997

BRUCE LEHMAN

*Attest:*

*Attesting Officer*    Commissioner of Patents and Trademarks

UNITED STATES PATENT AND TRADEMARK OFFICE
CERTIFICATE OF CORRECTION

PATENT NO. : 5,596,760
DATED     : January 21, 1997
INVENTOR(S) : Ueda

It is certified that error appears in the above-identified patent and that said Letters Patent is hereby corrected as shown below:

On the cover page, Item [56] References Cited, Foreign Patent Documents, add the following reference:
    62-42301    8/1987   Japan Signed and Sealed this Seventeenth Day of August, 1999

Attest:

Q. TODD DICKINSON

*Attesting Officer*    *Acting Commissioner of Patents and Trademarks*